No. 839,545. PATENTED DEC. 25, 1906.
C. A. BRINLEY.
FENCE.
APPLICATION FILED MAR. 17, 1906.
2 SHEETS—SHEET 1.
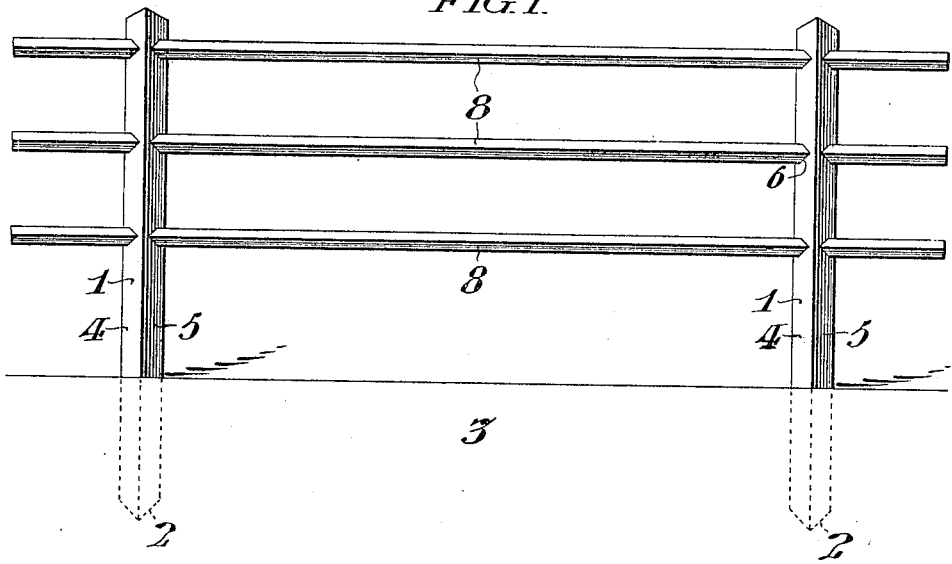
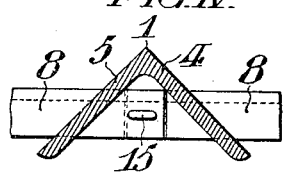
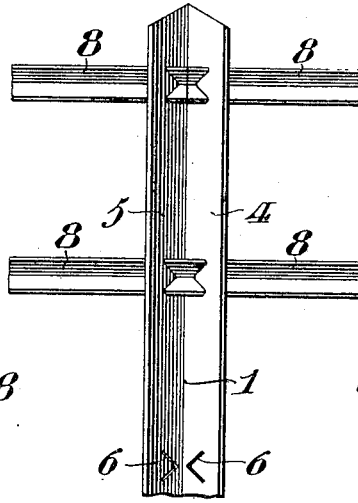
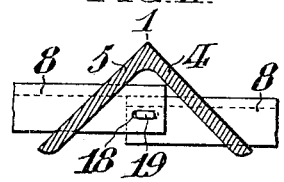
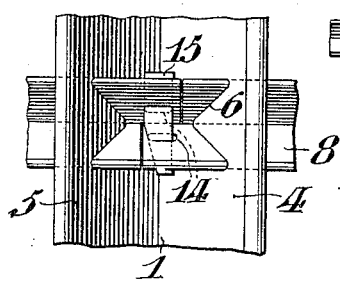
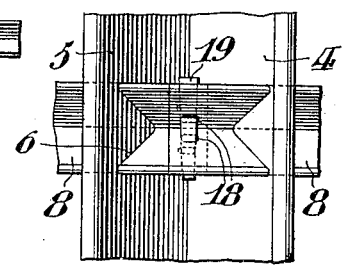
WITNESSES:
Clifton C. Hallowell
John C. Bergner
INVENTOR:
CHARLES A. BRINLEY,
by Paige, Paul & Fraley,
Attys.

No. 839,545. PATENTED DEC. 25, 1906.
C. A. BRINLEY.
FENCE.
APPLICATION FILED MAR. 17, 1906.
2 SHEETS—SHEET 2.
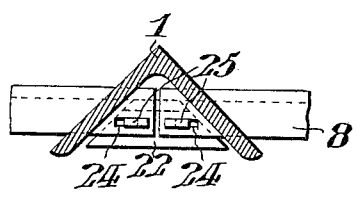
FIG. VIII.
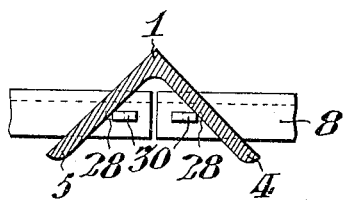
FIG. X.
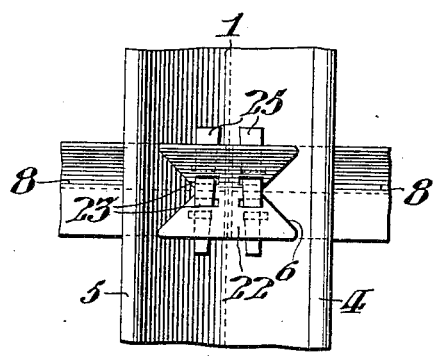
FIG. IX.
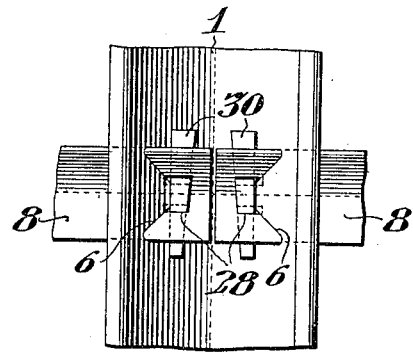
FIG. XI.
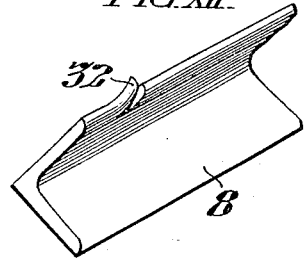
FIG. XII.
WITNESSES:
Clifton C. Hallowell
John C. Bergner
INVENTOR:
CHARLES A. BRINLEY,
By Paige, Paul & Foley
Attys.

UNITED STATES PATENT OFFICE.

CHARLES A. BRINLEY, OF PHILADELPHIA, PENNSYLVANIA.

FENCE.

No. 839,545.   Specification of Letters Patent.   Patented Dec. 25, 1906.

Application filed March 17, 1906. Serial No. 306,551.

*To all whom it may concern:*

Be it known that I, CHARLES A. BRINLEY, of Philadelphia, in the State of Pennsylvania, have invented certain new and useful Improvements in Fences, whereof the following is a specification, reference being had to the accompanying drawings.

It is an object of my invention to provide a fence which may be constructed wholly of wrought-metal angle-bars, without rivets, bolts, or similar connections.

The form of my invention hereinafter described comprises vertical posts and horizontal rails, all set with the opposite legs of their angles in equiangular relation to the plane of the fence, the rails being supported in angular slots in the opposite legs of the posts.

As hereinafter described, the respectively opposite angular slots in the angular legs of the posts may be in alinement with each other, so that a single rail may be extended through a post, or two rails may be entered upon respectively opposite sides with their ends abutting, or the respectively opposite slots may be so disposed that a rail entered through one side of a post will overlap and fit within a rail entered through the other side of said post.

A convenient adjunctive feature of my invention is the provision of means within the posts to prevent accidental withdrawal of the rails, and, as hereinafter described, such means may also serve to draw toward each other the ends of separate rails which are entered in respectively opposite sides of a post.

My invention comprises the various novel features of construction and arrangement hereinafter more definitely specified.

In the drawings, Figure I is a front elevation of a fence conveniently embodying my improvements. Fig. II is a plan view of the fence shown in Fig. I. Fig. III is a rear elevation showing a fragment of said fence, comprising a post and rails entered therein. Figs. IV and V are respectively fragmentary sectional and elevational views showing means for drawing together the abutting ends of separate rails entered through respectively opposite sides of a post in alinement with each other. Figs. VI and VII are respectively fragmentary sectional and elevational views showing means for drawing together in lapped relation the ends of separate rails entered through respectively opposite sides of a post. Figs. VIII and IX are respectively fragmentary sectional and elevational views showing means for adjustably drawing together the abutting ends of separate rails entered through respectively opposite sides of a post in alinement with each other and comprising a link distinct from said rails. Figs. X and XI are respectively fragmentary sectional and elevational views showing means for independently securing in a post the respectively opposed ends of separate rails entered through the opposite sides of the post. Fig. XII is a fragmentary perspective view of a rail provided with unitary means to retain it in a post.

Referring to Figs. I and II, the posts 1 are formed of wrought-metal angle-bars, having their ends 2 obliquely cut, as indicated, so as to be readily driven into the ground 3, and are set with their opposite angular legs 4 and 5 in equiangular relation to the general plane of the fence, as best shown in Fig. II. Said posts 1 are provided with angular slots 6, which are disposed in the opposite sides or angular legs thereof in equiangular relation to the line of junction between said legs, as shown in Fig. I and at the lower portion of Fig. III.

The horizontal rails 8 are also formed of wrought-metal angle-bars and are supported solely by said posts 1, with their opposite angular legs in equiangular relation to the general plane of the fence, the ends of said rails being entered in the angular slots 6 in said posts, as best shown in Fig. III. If said slots 6 are made in alinement in the opposite sides of the posts 1, as shown in the form of my invention illustrated in Figs. I to V, inclusive, the rails 8 may extend continuously through the posts 1, as indicated at the central portion of Fig. III, or separate rails may be entered in respectively opposite sides of the posts, as indicated at the upper portion of Fig. III.

Although I prefer to make the posts with the slots 6 in alinement, as above described, they may be disposed out of alinement, so that a rail entered through one side or angular leg of the post will overlap a rail entered through the other side thereof, as shown in Figs. VI and VII.

Although a substantial fence may be made with the rails terminating in or extending through the posts, as indicated in Fig. III, without the provision of special means to retain the rails in the posts, I prefer to employ wedging means to draw the ends of the rails toward each other through the opposite legs of the posts, so as to tighten the whole fence structure and to retain the ends of the rails in the posts. For instance, as shown in Figs. IV and V, the rails 8 extend through slots 6, which are in alinement in the opposite angular legs 4 and 5 of the post 1; but said rails are recessed so that the upper leg of one rail overlaps the lower leg on the other rail, and the overlapping ends are provided with slots 14 to receive the wedge 15, which may be entered through the upper rail in engagement with the slot in the lower rail when the rails are separated to a greater extent than shown in Fig. V, and by driving said wedge into the position shown in said figure said rails may be drawn together and retained in the post, as indicated. Similar wedging means may be employed when the ends of the rails are overlapped, as shown in Figs. VI and VII, wherein the rails are provided with slots 18 to receive the wedge 19, which, like the wedge 15, above described, may be utilized to draw the ends of the rails together as well as to retain the rails in the posts.

In the form of my invention shown in Figs. VIII and IX the rails 8 extend through slots 6, which are in alinement in the opposite sides 4 and 5 of the post 1, and said rails are connected by the link 22, conveniently formed of an angularly-cut portion of a rail angle-bar provided with slots 23 in registry with slots 24 in the respectively opposed ends of said rails 8, so that the wedges 25 may be driven through the slots in the rails and in said link to draw said rails 8 together and retain them in the post.

It may be observed that all of the wedging means above described are so arranged as to adjust or strain both of the opposed rails simultaneously and not independently, although said wedging means are independent of the post. However, it is to be understood that I may provide wedging means to adjust or strain the rails independently, and, as shown in Figs. X and XI, such means is not independent of the post, although carried by the rails, the opposed ends of the rails 8 being provided with slots 28, which, as indicated in Fig. X, extend outwardly beyond the inner surface of the post to receive the wedges 30 within the post, so that when said wedges are driven downwardly in contact with the inner surface of the post said rails 8 may be independently drawn toward each other and retained in the post.

It may be observed that although the wedging means last described is shown applied to rails which extend in alinement with each other through the respectively opposite sides of the post said means may be applied with equal facility to rails which are in staggered relation.

Although I prefer to employ means distinct from the posts and rails to retain them in assembled relation, as above described, it is to be understood that other means may be employed for that purpose. For instance, as shown in Fig. XII, the rail 8 is cut at its edge to form a prong 32, which may be turned aside from its normal plane after the rail is inserted in the post to prevent withdrawal of the rail.

It may be noted that all of the means above described for retaining the rails and posts in assembled relation are located in the hollow portions of the posts, so as not to be visible from the front of the fence. Moreover, the arrangement of the post and rail members of the fence in equiangular relation to the general plane thereof not only causes the fence to present a more massive appearance than if said elements were disposed in any other relation, but there are certain structural advantages attained by such relation of the fence members. For instance, the posts being set in equiangular relation to the plane of the fence, as above described, two vertical planes of bearings are afforded for the rails in each post—viz., a bearing-plane in each of the angular legs of the post, which are then oppositely disposed in the plane of the fence, whereas if the posts were set with one leg parallel with the plane of the fence and the other leg extending transversely to said plane only one bearing plane for the rails could be afforded by slotting the post. Also it may be observed that by disposing the rails in equiangular relation to the plane of the fence, as above described, posts having shorter angular legs may be employed to receive a given size of rails than if the rails were otherwise set.

I do not desire to limit myself to the precise details of construction and arrangement herein set forth, as it is obvious that various modifications may be made therein within the scope of the claims without departing from the essential features of my invention.

I claim—

1. In a fence, the combination with a series of vertically-disposed posts, each formed of a wrought-metal angle-bar, set with the opposite legs of its angles in equiangular relation to the plane of the fence and having angular slots in its opposite legs extending in equiangular relation to said plane; of a series of horizontally-disposed rails each formed of a wrought-metal angle-bar set with the opposite legs of its angles in equiangular relation to said plane; the ends of said rails being supported in slots in said posts; and, wedging means in said posts, whereby said rails are retained in engagement therewith, substantially as set forth.

2. A fence-rail, formed of a wrought-metal angle-bar, having slots in its opposite ends, arranged to receive wedges, substantially as set forth.

3. In a fence, the combination with a hollow metal post; of metal rails having their ends entered in said post; and, means wholly within the hollow of said post, preventing the withdrawal of said rails, substantially as set forth.

4. In a fence, the combination with a hollow metal post; of metal rails having their ends entered in said post; and, means wholly within the hollow of said post preventing the withdrawal of said rails, comprising a wedge, substantially as set forth.

5. In a fence, the combination with a post formed of a wrought-metal angle-bar; of rails having their ends entered through the opposite angular legs of said bar; and, wedging means engaging said rails within said post and preventing the withdrawal of said rails, substantially as set forth.

6. In a fence, the combination with a hollow metal post; of metal rails having their ends entered through slots in the opposite sides of said post; and, means in the hollow of said post, supported by said rails independently of said post, arranged to prevent the withdrawal of the rails, substantially as set forth.

7. In a fence, the combination with a hollow metal post; of metal rails having their ends entered through slots in the opposite sides of said post, and having slots in their ends extending within said post, and, wedges extending through said slots in the rails, substantially as set forth.

8. In a fence, the combination with a hollow metal post; of metal rails having their ends entered through slots in the opposite sides of said post, and having slots in their ends extending within said post, and, rail-retaining means extending through said slots in the rails, substantially as set forth.

9. In a fence, the combination with a hollow metal post; of metal rails entered through slots in the opposite sides of said post, the ends of said rails overlapping within the post, substantially as set forth.

10. In a fence, the combination with a hollow post formed of a wrought-metal angle-bar; of rails formed of wrought-metal angle-bars entered through slots in the opposite sides of said post, the ends of said rails overlapping within the post and being inclosed by the latter, substantially as set forth.

11. A hollow fence-post formed of a wrought-metal angle-bar having the opposite legs of its angles extending in oblique relation to the plane of the fence and having slots in alinement in its respective legs, arranged to support rails extending from opposite sides of said post in a common plane, with their ends in the post in said plane, in alinement with the portions of said rails exterior to said post, substantially as set forth.

12. In a fence, the combination with a post formed of a wrought-metal angle-bar set with the opposite legs of its angles in oblique relation to the plane of the fence, and having angular slots in alinement in its opposite legs with their legs extending in oblique relation to said plane; of separate rails each formed of a wrought-metal angle-bar set with the opposite legs of its angles in oblique relation to said plane and entered in said post from respectively opposite sides thereof; the opposed separate ends of said rails being inclosed by said post and being in alinement with the portions of said rails exterior to said post, substantially as set forth.

13. In a fence, the combination with a hollow post provided with angular slots in its opposite sides with their legs extending in oblique relation to the plane of the fence; of separate rails each formed of a wrought-metal angle-bar, set with the opposite legs of its angles in oblique relation to said plane, and entered in the slots in said post from respectively opposite sides of the latter; the opposed separate ends of said rails being inclosed by said post, and being in alinement with the portions of said rails exterior to said post, substantially as set forth.

In testimony whereof I have hereunto signed my name, at Philadelphia, Pennsylvania, this 15th day of March, 1906.

CHARLES A. BRINLEY.

Witnesses:
CHARLES E. BRINLEY,
PAULINE D. BOWIE.